(12) United States Patent
Yennie et al.

(10) Patent No.: US 12,187,084 B2
(45) Date of Patent: *Jan. 7, 2025

(54) SPRING TIRE WHEEL ASSEMBLY WITH BUMP STOP

(71) Applicant: The SMART Tire Company Inc., Akron, OH (US)

(72) Inventors: Brian Yennie, Akron, OH (US); Earl Cole, Akron, OH (US); Jim Benzing, North Canton, OH (US)

(73) Assignee: THE SMART TIRE COMPANY, INC., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,403

(22) Filed: Nov. 6, 2023

(65) Prior Publication Data

US 2024/0066924 A1     Feb. 29, 2024

Related U.S. Application Data

(63) Continuation of application No. 18/103,685, filed on Jan. 31, 2023, now Pat. No. 11,807,053.
(Continued)

(51) Int. Cl.
| | |
|---|---|
| *B60C 7/24* | (2006.01) |
| *B60C 7/06* | (2006.01) |
| *B60C 7/14* | (2006.01) |

(52) U.S. Cl.
CPC .......... *B60C 7/24* (2013.01); *B60C 7/06* (2013.01); *B60C 7/14* (2013.01)

(58) Field of Classification Search
CPC ..... B60C 17/041; B60C 17/043; B60C 17/06; B60C 2017/063; B60C 15/028; B60C 7/06; B60C 7/14; B60C 7/24

See application file for complete search history.

(56) References Cited

U.S. PATENT DOCUMENTS

| | | | |
|---|---|---|---|
| 1,142,279 | A | 6/1915 | Stephens |
| 3,254,692 | A | 6/1966 | Travers |

(Continued)

FOREIGN PATENT DOCUMENTS

| | | |
|---|---|---|
| EP | 2386430 B1 | 7/2013 |
| EP | 2435256 B1 | 3/2016 |

(Continued)

OTHER PUBLICATIONS

International Search Report and Written Opinion issued in PCT/US2023/011951.

*Primary Examiner* — Kip T Kotter
(74) *Attorney, Agent, or Firm* — Jeffer Mangels; Butler & Mitchell LLP; Brennan C. Swain, Esq.

(57) ABSTRACT

A wheel assembly that includes an outer rim assembly with a first outer rim portion, a second outer rim portion, and a plurality of outer cross members extending between the first and second outer rim portions, a tire assembly secured to the outer rim assembly, and at least a first bump stop assembly. The tire assembly includes an outer main body portion that includes first and second outer side wall portions and an outer contact portion extending transversely between the first and second outer side wall portions. The first bump stop assembly includes a first inner rim portion, a second inner rim portion and an inner main body portion. The inner main body portion includes first and second inner side wall portions and an inner contact portion extending transversely between the first and second inner side wall portions. The inner contact portion is coupled to the outer contact portion.

17 Claims, 8 Drawing Sheets

Related U.S. Application Data

(60) Provisional application No. 63/305,109, filed on Jan. 31, 2022.

(56) References Cited

U.S. PATENT DOCUMENTS

| | | |
|---|---|---|
| 3,568,748 A | 3/1971 | Paine |
| 3,645,312 A | 2/1972 | Kolodziej |
| 3,844,325 A | 10/1974 | Betancourt |
| 8,141,606 B2 | 3/2012 | Benzing |
| 8,662,122 B2 | 3/2014 | Benzing |
| 8,720,504 B2 | 5/2014 | Benzing |
| 8,931,531 B2 | 1/2015 | Kubeck |
| 10,427,461 B1 | 10/2019 | Padula |
| 10,449,804 B1 | 10/2019 | Padula |
| 11,807,053 B2 * | 11/2023 | Yennie ...................... B60C 7/20 |
| 2012/0048440 A1 | 3/2012 | Lettieri |
| 2017/0166009 A1 | 6/2017 | Benzing |
| 2018/0086141 A1 | 3/2018 | Schaedler |
| 2019/0337329 A1 | 11/2019 | Cron |
| 2020/0039293 A1 | 2/2020 | Cron |
| 2022/0194130 A1 | 6/2022 | Kouno |
| 2022/0227174 A1 | 7/2022 | Kouno |

FOREIGN PATENT DOCUMENTS

| | | |
|---|---|---|
| KR | 20200073401 A | 6/2020 |
| WO | 2021137957 A1 | 7/2021 |

\* cited by examiner

SPRING TIRE WHEEL ASSEMBLY WITH BUMP STOP

CROSS-REFERENCE TO RELATED APPLICATIONS

This application is a continuation of U.S. patent application Ser. No. 18/103,685 filed Jan. 31, 2023, which claims the benefit of U.S. Provisional Application No. 63/305,109, filed on Jan. 31, 2022, the entireties of which are incorporated by reference herein.

FIELD OF THE INVENTION

The present invention relates to a spring tire that may include shape memory alloys ("SMAs"), and more particularly to a spring tire that may include shape memory alloys, a bump stop and integrated tread lugs.

BACKGROUND OF THE INVENTION

Non-pneumatic tire designs that includes helical springs as the structural elements are known (known as spring tires). These tires were invented to provide improved load carrying capacity and long life as compared to the original "moon tire" used for lunar exploration. However, these prior art tires are deficient relative to the present invention in that they include limited load carrying capacity, the ability to "unwind" and come part, are prone to permanent damage when deformed (made from spring steel), and are very heavy. Later, steel springs were replaced with shape memory alloy springs, for improved performance.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first embodiment of the present invention there is provided a wheel assembly that includes an outer rim assembly having a first outer rim portion, a second outer rim portion and a plurality of outer cross members extending between the first outer rim portion and the second outer rim portion, a tire assembly that includes an outer main body portion, and at least a first bump stop assembly that includes a first inner rim portion, a second inner rim portion and an inner main body portion. The outer main body portion includes a plurality of outer shape memory elements having first and second opposite ends. The first end of each outer shape memory element is secured or connected to the first outer rim portion and the second end of each outer shape memory element is secured or connected to the second outer rim portion. The outer main body portion includes a first outer side wall portion, a second outer side wall portion and an outer contact portion extending transversely between the first and second outer side wall portions. The inner main body portion includes a plurality of inner shape memory elements having first and second opposite ends. The first end of each inner shape memory element is secured or connected to the first inner rim portion and the second end of each inner shape memory element is secured or connected to the second inner rim portion. The inner main body portion includes a first inner side wall portion, a second inner side wall portion and an inner contact portion extending transversely between the first and second inner side wall portions. The inner contact portion is coupled to the outer contact portion.

In a preferred embodiment, the wheel assembly includes a tread portion having a plurality of tread shape memory elements. The tread portion couples the inner contact portion to the outer contact portion. Preferably, the plurality of tread shape memory elements comprises at least first and second tread shape memory elements, the plurality of outer shape memory elements comprises at least first and second outer shape memory elements, and the plurality of inner shape memory elements comprises at least first and second inner shape memory elements. The first tread shape memory element may couple the first outer shape memory element to the first inner shape memory element. In a preferred embodiment, the first tread shape memory element wraps, extends or coils around the first outer shape memory element and the first inner shape memory element, thereby coupling the first outer shape memory element to the first inner shape memory element.

In a preferred embodiment, the first tread shape memory element includes a plurality of coils and defines a spring or coil interior and the first outer shape memory element and the first inner shape memory element extend through the spring interior, thereby coupling the first outer shape memory element to the first inner shape memory element. The second tread shape memory element may include a plurality of coils and at least one of the plurality of coils of the first tread shape memory element may be connected to at least one of the plurality of coils of the second tread shape memory element.

The plurality of outer cross members may define a stop surface and the first and second inner rim portions may define an inner contact surface. A deflection distance may be defined between the inner contact surface and the stop surface and when the outer main body portion is deflected a predetermined distance the inner contact surface contacts the stop surface. The plurality of outer shape memory elements may include a first set of lug shape memory elements and a second set of non-lug shape memory elements where the lug shape memory elements have a greater stiffness than the non-lug shape memory elements.

In a preferred embodiment of the invention, the wheel assembly may include a second bump stop assembly that includes a second inner contact portion that is coupled to the outer contact portion. The plurality of outer shape memory elements, tread shape memory elements and plurality of inner shape memory elements may be made of a shape memory alloy.

In accordance with another aspect of the present invention there is provided a wheel assembly that includes an outer rim assembly that includes a first outer rim portion, a second outer rim portion, and a plurality of outer cross members extending between the first outer rim portion and the second outer rim portion, a tire assembly secured to the outer rim assembly, and at least a first bump stop assembly. The tire assembly includes an outer main body portion that includes a first outer side wall portion, a second outer side wall portion and an outer contact portion extending transversely between the first and second outer side wall portions. The first bump stop assembly includes a first inner rim portion, a second inner rim portion and an inner main body portion. The inner main body portion includes a first inner side wall portion, a second inner side wall portion and an inner contact portion extending transversely between the first and second inner side wall portions. The inner contact portion is coupled to the outer contact portion. The tire assembly defines a tire assembly outer diameter and the inner contact portion may be coupled to the outer contact portion about the tire assembly outer diameter. The present invention is directed to a wheel assembly that includes a tire assembly that may be both top and bottom loading, provides a flexible inner bump stop for heavy loads, a flat (or other shaped wire tread for increased traction, and variable stiffness radials or side walls for climbing capability. The current invention enables superior load carrying, flotation, climbing and traction capabilities for a spring tire, when compared to the prior art.

In a preferred embodiment, the inventive tire assembly may include an inner bump stop assembly. Shorter radial elements may provide high load-carrying capability at the point of contact. The side walls of the bump stop assembly are preferably shaped to act as a column or provide columnar strength. During use, the bump stop is engaged under normal conditions, instead of acting only as a protection against excessive deflection of the tire (where the outer surface of the bump stop is spaced from the outer surface of the tire). Due to its relatively small size, the tire assembly is also lightweight. The inner bump stop assembly may aid with increased load carrying capacity, improved footprint and evenly distributed ground pressure. The bump stop assembly is designed to optimize the tire footprint and better distribute ground pressure (as a result of the connection of the contact portion of the bump stop assembly to the contact portion of the outer main body portion). Furthermore, when the tire assembly encounters a predetermined amount of deflection, the bump stop assembly is configured to contact the cross members or spacers or other portion of the outer rim assembly to prevent any further deflection. The bump stop on previous lunar roving vehicle (LRV) tires only engaged when the tire was overly deflected, thus adding mass to the tire which is rarely used.

In a preferred embodiment, the tire may include flat wire springs for the tread element. The flat tread springs provide for improved traction and flotation. As compared to round wire springs, the spring elements are more resistant to unscrewing. However, in another embodiment, the tread element can include non-flat or round wire springs. Tread design becomes independent of load carrying capacity so flotation and traction can be tailored to the environment. Adjacent tread shape memory elements or springs may be interwoven with one another as well as with the contact portions of the tire assembly and the bump stop assembly.

In a preferred embodiment, at least some of the various wires/springs of the different elements or components of the tire assembly are interwoven with one another. For example, the wire elements of the bump stop or bump stop assembly (e.g., the contact portion) may be interwoven with or otherwise connected to the contact portion of the tire assembly or radial elements. This feature, combined with the use of a spoked wheel to distribute load to the entire wheel (e.g., around the contact surface of the wheel in the case of the interwoven or connected contact portions), as opposed to a top-loading or bottom-loading tire, is innovative. Typically, wheels often are only bottom loading where all footprint forces are transferred to the rim through the contact patch (the area of the tire contacting the ground). However, the present invention allows the load to be transferred around the outer diameter (OD) of the wheel assembly as a result of the circular bump stop assembly being secured or connected to the tire assembly. In other words, the bump stop springs or inner shape memory elements, radial springs or outer shape memory elements and the tread springs or tread shape memory elements are woven or connected together so that load is transferred from the footprint to the entire OD of the wheel assembly, which may increase load carrying capacity of a vehicle equipped with one or more of the wheel assemblies without additional weight.

In a preferred embodiment, the tire assembly may include the alternating use of stiffer or softer springs in the tread element, in order to provide uneven deflection, which is useful for climbing. The tread lugs include radial elements (e.g., wires) of variable stiffness or different stiffness than the other wires in the main body portion. To aid in climbing ability, the tire's radial elements are designed to have variable stiffness. By alternating the deflection of different areas of the tire, tread lugs or lug sections are formed when sufficient pressure is applied. To aid in tire climbing, soft springs deflect more than the stiffer springs, thus the stiffer springs act like tread lug. The lug sections may also provide help with traction in sand and other granular environments.

The tread shape memory elements, outer shape memory elements and/or inner shape memory elements (any of the shape memory elements, wire, springs, etc.) may have any cross-sectional shape, e.g., flat, round, rectangular, etc. It will be appreciated by those of ordinary skill in the art that the load carrying capacity of the inner bump stop assembly (and the springs or SMA wires or elements thereof) is highest at the crown of the tire assembly, offsetting the lowest capacity area of the outer springs, where it is inner woven with the outer contact portion of the main body portion, and the springs, wires or elements of the tread portion. In a preferred embodiment, the various wires, springs or elements of the present invention are made of a shape memory alloy and are configured to retain or return to their original shape after a load, force or the like is applied thereto. It will be appreciated that the term shape memory alloy is not intended to be limiting. Furthermore, the use of the term "shape memory" is not intended to limit the component to having to made from or comprise a shape memory alloy. Any elements that include the phrase "shape memory", including, but not limited to outer shape memory element, inner shape memory element and tread shape memory element, are not limited to comprising a shape memory element, but are configured to retain or return to their original or initial shape after having been deformed. This can include a spring or spring material.

In a preferred embodiment, the wheel assembly is also both top and bottom loading. In use, the tire portion is bottom loading where the footprint forces are transferred to the rim assembly through the radial wires in the contact path. However, the tire assembly is also top loading where the bump stop assembly springs or inner shape memory elements, main body portion springs or outer shape memory elements and the tread portion or tread shape memory elements are woven together so that load is transferred from the footprint to the entire outer diameter of the wheel assembly, thereby increasing load carrying capacity. In a preferred embodiment, the bump stop assembly is only connected to the tire assembly or the outer shape memory elements via the connection between the inner and outer contact portions. Otherwise, the bump stop assembly is free to move within the tire interior. The top loaded tire is similar to a regular bicycle rim where if a load is applied at the axle, the assembly can carry the load with a single spoke and the load is distributed around the entire rim.

Tire characteristics, ability and other considerations, such as traction, flotation, weight capacity, etc. can be changed or fine-tuned based on the number or density of the outer shape memory elements, inner shape memory elements and/or tread shape memory elements, the shape, stiffness, spring constant or other characteristics of the various shape memory elements, among other things. The tread shape may be adjusted via the number of tread springs.

In a preferred embodiment, the wheel assembly also provides damping. For example, in an exemplary embodiment, the present invention may provide naturally occurring damping with 785 tread springs (around the circumference of the tire assembly), 51 pitches per spring, which provides 40,000 frictional contact points for natural damping. In an exemplary embodiment, the tread springs or tread shape memory elements may comprise 0.040" diameter, spring steel and are 12.75" long, 0.23" OD and 0.216" pitch with open ends. In an exemplary embodiment, the radial springs or outer shape memory elements may comprise 0.050" filament diameter 8" long, piano wire.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
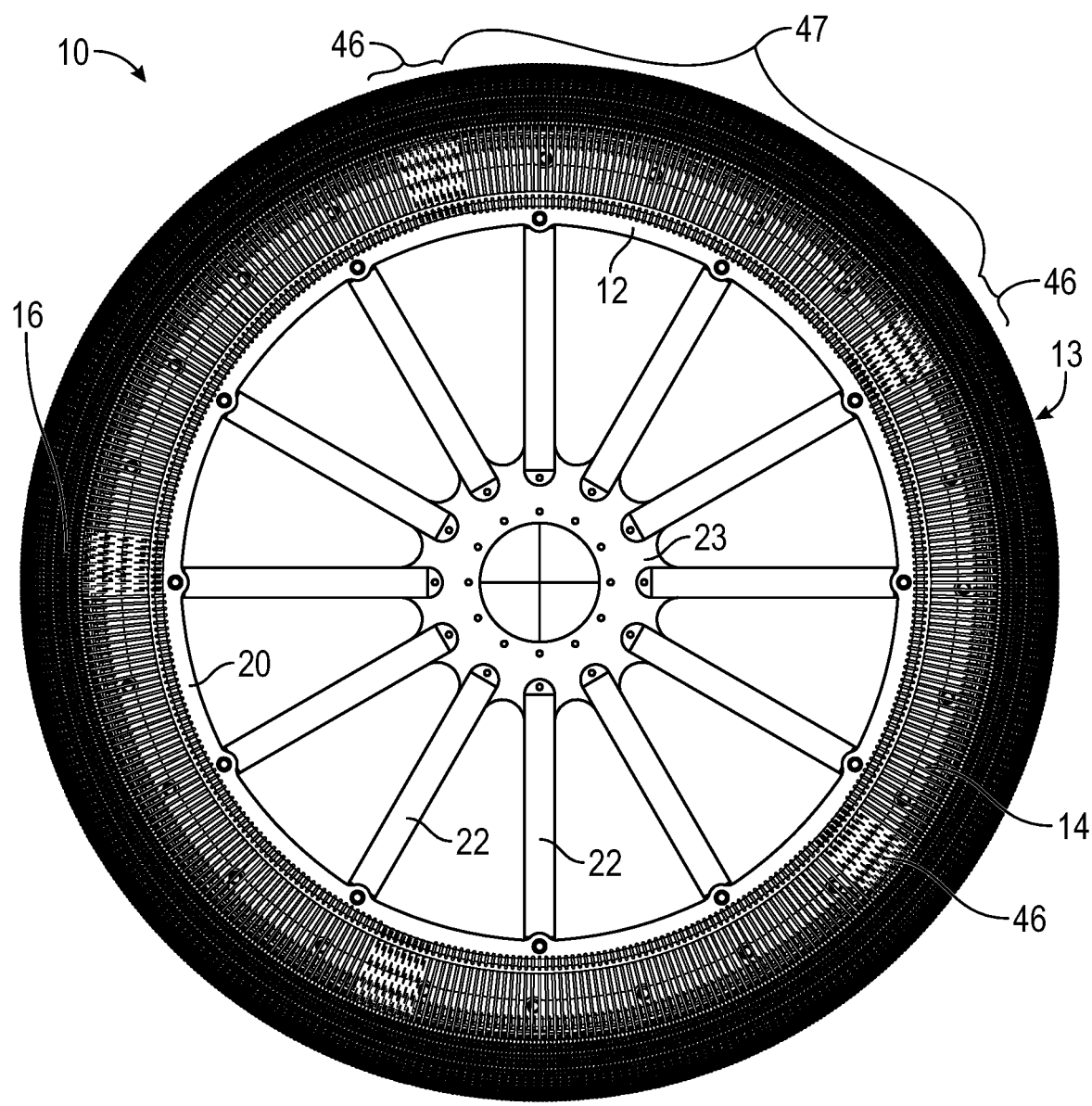
FIG. 1 is a side elevational view of a wheel assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward" and "below" used herein are merely for ease of description and refer to the orientation of the components as shown in the figures. It should be understood that any orientation of the components described herein is within the scope of the present invention.

Described herein and shown in FIGS. 1-5 is a wheel assembly 10 in accordance with a preferred embodiment of the present invention that includes an outer rim assembly 12, a tire assembly 13, at least one bump stop assembly 18 and a tread portion 16. In a preferred embodiment, the outer rim assembly 12 includes left and right or first and second outer rim portions 20, a plurality of spoke members 22 (that extend outwardly from a central hub 23) and a plurality of outer cross members 24 extending between the first outer rim portion 20 and the second outer rim portion 20. The spoke members 22 extend generally radially outwardly and connect to one of the first and second outer rim portions 20. In a preferred embodiment, each spoke member 22 extends to and is secured to or with an end of one of the outer cross members 24. A fastener, such as threaded fasteners 29 or the like, may be used to secure or attach the outer cross members 24 and/or the distal or outer ends of the spoke member 22 to the first and second outer rim portions 20 (see FIG. 3). Any arrangement of spokes or spoke members extending outwardly to a rim or outer rim portions 20 is within the scope of the present invention. Welding, gluing, adhering or other attachment method can be used to attach or secure the various components, such as the outer cross members 24, first and second outer rim portions 20 and spoke member 22 to one another. Preferably, the bump stop assembly 18 extends around the entire circumference of the wheel assembly and, in particular, around the inner diameter of the tire assembly 13.

Figure 2:
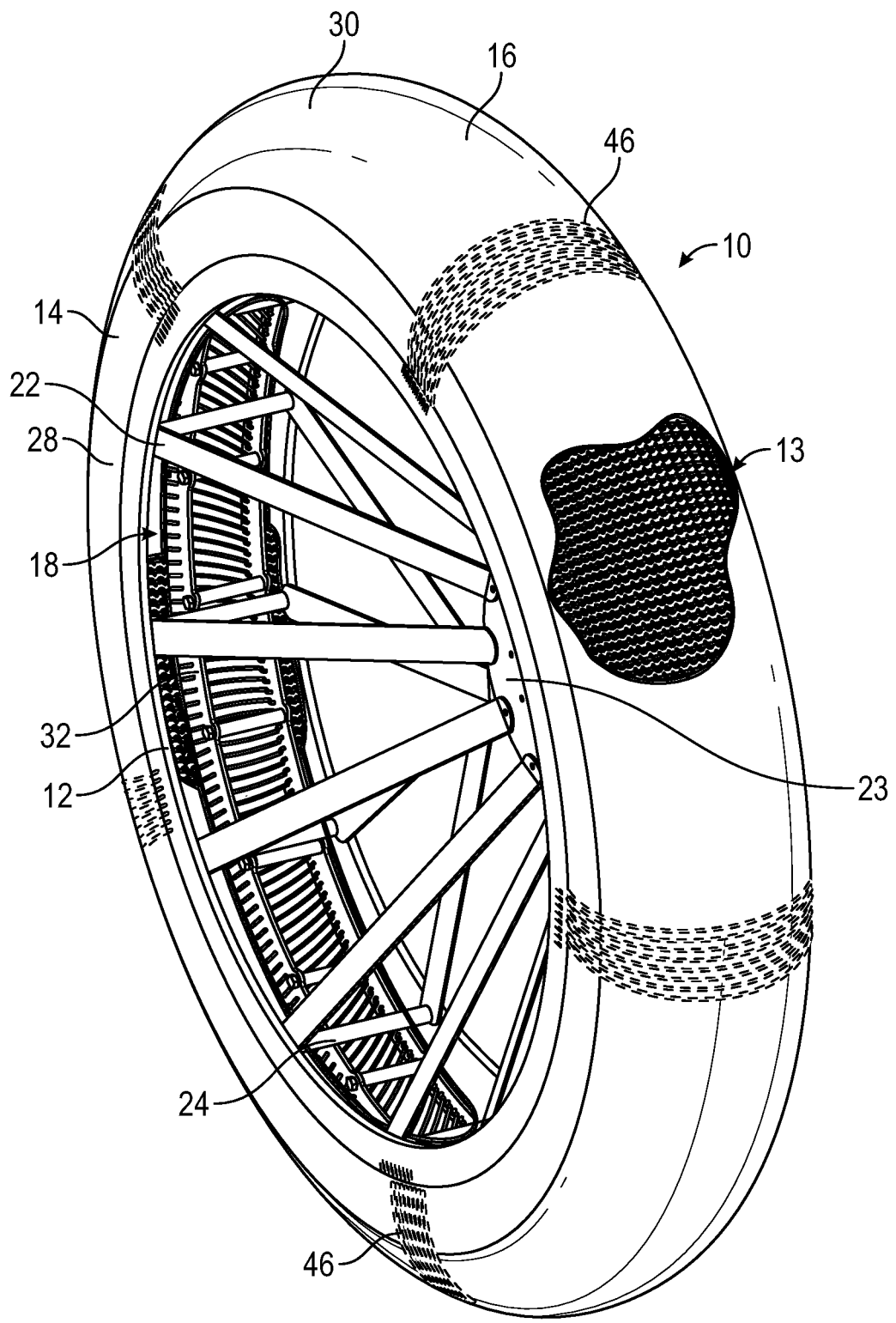
FIG. 2 is a perspective view of the wheel assembly of FIG. 1.

The tire assembly 13 includes an outer main body portion 14 and the tread portion 16. The tire assembly 13, including the outer main body portion 14 and the tread portion 16, are formed from or comprise a large number of shape memory elements, wires or springs that are interwoven with one another. As a result, when showing the tire assembly 13 in the figures the various shape memory elements can be difficult to see. Therefore, it will be appreciated that due to the large number of shape memory elements, portions of FIG. 2 are shown as a solid shape with just a portion of the plurality of wires making up the tire portion 13 shown in detail. It should be understood that, as shown in FIG. 1, the entire tire assembly 13 comprises individual shape memory elements. The portions shown as solid sections in FIG. 2 are only shown this way for drawing simplicity.

Figure 3:
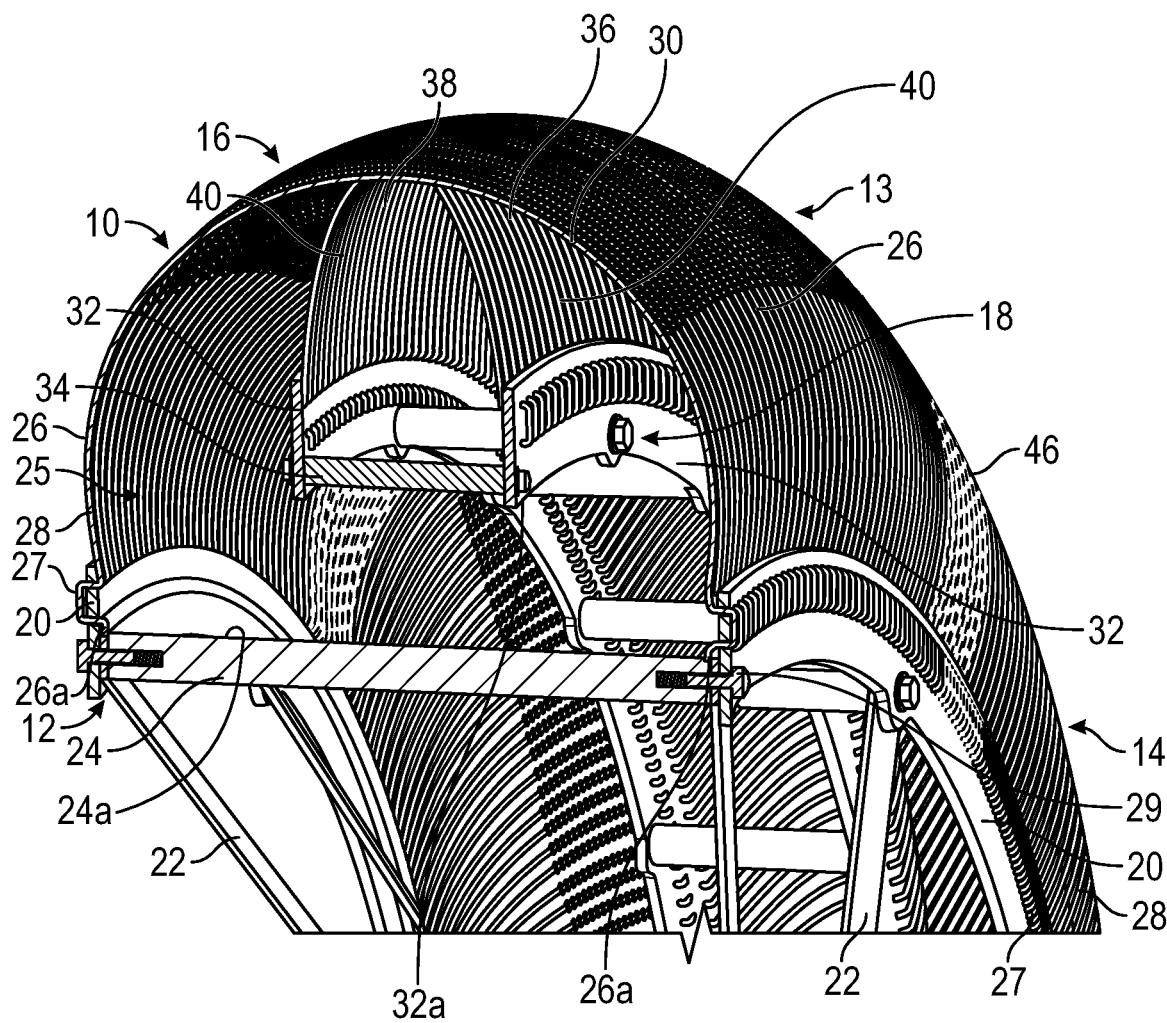
FIG. 3 is a cross-sectional perspective view of a portion of the wheel assembly of FIG. 1.
Figure 4:
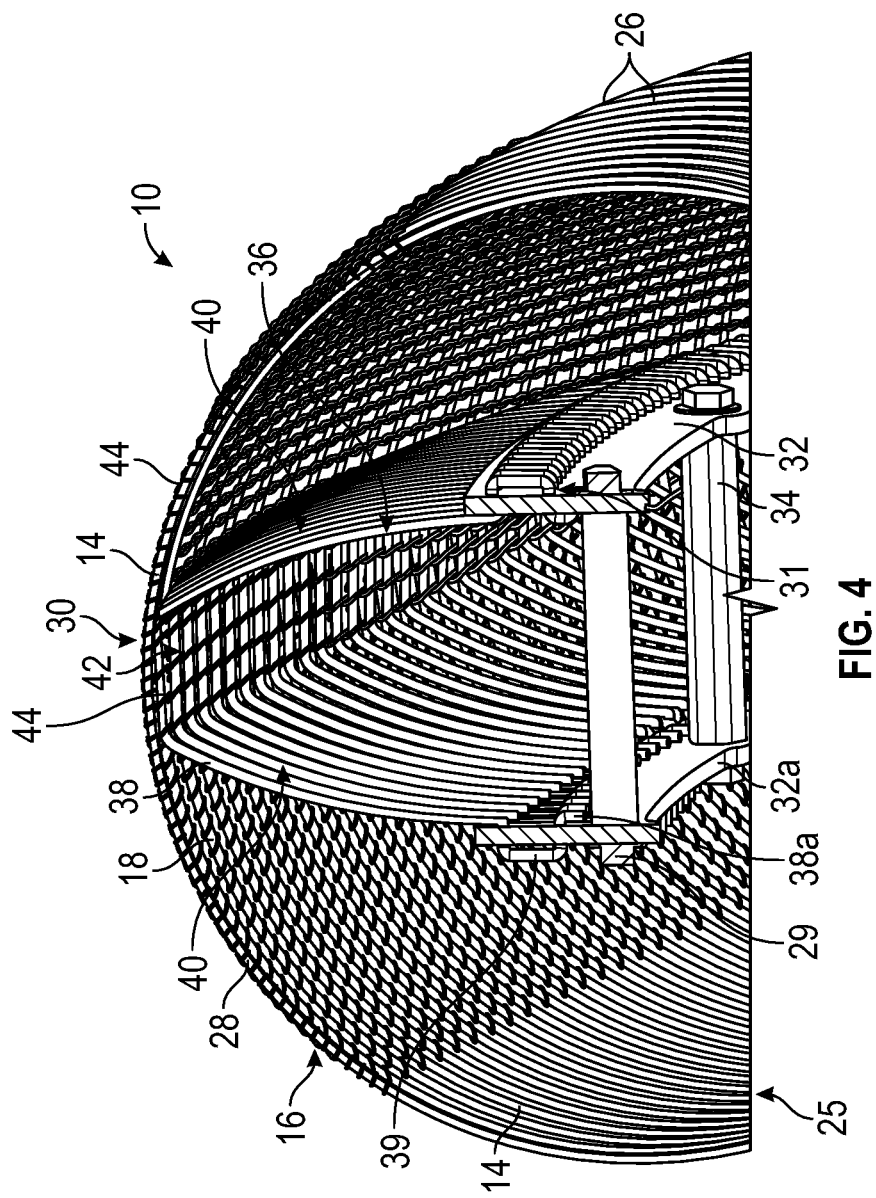
FIG. 4 is another cross-sectional perspective view of a portion of the wheel assembly of FIG. 1.

As shown in FIGS. 3-4, the outer main body portion 14 includes a plurality of outer shape memory elements 26 (e.g., a plurality of SMA springs or wires) having first and second opposite ends 26a. The first end 26a of each outer shape memory element 26 is connected to the first outer rim portion 20 and the second end 26a of each outer shape memory element is connected to the second outer rim portion 20. Preferably, the outer main body portion 14 includes first and second outer side wall portions 28 and an outer contact portion 30 extending transversely between the first and second outer side wall portions 28. As shown in FIG. 3, the SMA wires or outer shape memory elements 26 extend radially outwardly from the first outer rim portion 20 to form the first outer side wall portion 28, then curve or extend transversely to form the outer contact portion 30 and then extend radially inwardly to form the second outer side wall portion 28 and to the second outer rim portion 20. In a preferred embodiment, each outer shape memory element 26 includes connection portions 27 at the opposite ends thereof that each extend through one more connection openings 31 (see FIG. 6) defined in the first and second outer rim portions 20. In a preferred embodiment, the outer rim portions 20 each include two connection openings 31. However, the connection portions 27 can also extend through a single connection opening. Any method for connecting the opposite ends of the outer shape memory elements 26 to the first and second outer rim portions 20 is within the scope of the present invention. The connection portions 27 may help protect the first and second outer rim portions 20.

The bump stop assembly 18 includes left and right or first and second inner rim portions 32, a plurality of inner cross members 34 extending between the first and second inner rim portions 32 and an inner main body portion 36. The inner main body portion 36 preferably includes a plurality of inner shape memory elements 38 (e.g., a plurality of SMA springs or wires) having first and second opposite ends 38a. The first end 38a of each inner shape memory element 38 is connected to the first inner rim portion 32 and the second end 38a of each inner shape memory element 38 is connected to the second inner rim portion 32. The first and second inner rim portions 32 may be referred to herein together as an inner rim assembly. The inner main body portion 36 includes left and right or first and second inner side wall portions 40 and an inner contact portion 42 extending transversely between the first and second inner side wall portions 40. In a preferred embodiment, the outer main body portion 14 defines a tire interior 25 and at least a portion of the bump stop assembly 18 is disposed in the tire interior 25. As shown in FIG. 4, the inner shape memory elements 38 extend radially outwardly from the first inner rim portion 32 to form the first inner side wall portion 40, then extend transversely to form the inner contact portion 42 and then extend radially inwardly to the second inner rim portion 32. In a preferred embodiment, each inner shape memory element 38 includes connection portions 39 at the opposite ends thereof that each extend through one more connection openings 31 defined in the first and second inner rim portions 32. In a preferred embodiment, the inner rim portions 32 each include two connection openings 31. Any method for connecting the opposite ends of the inner shape memory elements 38 to the first and second inner rim portions 32 is within the scope of the present invention.

Figure 5:
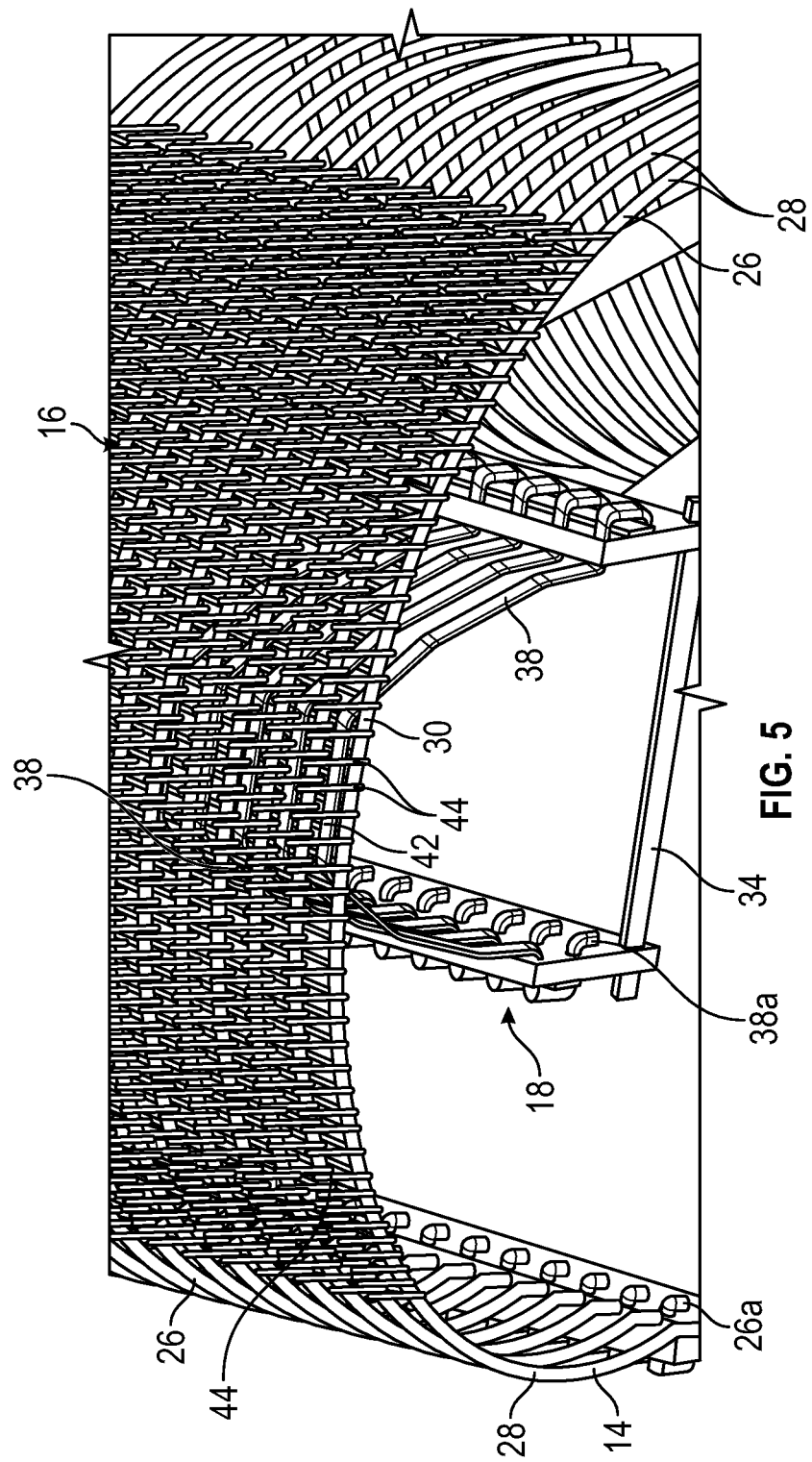
FIG. 5 is another cross-sectional perspective view of a portion of the wheel assembly of FIG. 1.

In a preferred embodiment, the inner shape memory elements 38 of the bump stop assembly 18 are interwoven with, connected to or are otherwise secured to or with the outer shape memory elements 26 of the outer main body portion 14. Preferably, the inner contact portion 42 is secured to the outer contact portion 30. As a result, the bump stop assembly 18 is load carrying. In a preferred embodiment, the tread portion 16 includes a plurality of tread shape memory elements 44 (e.g., a plurality of SMA springs or wires). Each of the tread shape memory elements 44 preferably extend, wrap or coil around one or more of the outer shape memory elements 26 (and the outer contact portion 30 thereof). As shown in FIGS. 4 and 5, in a preferred embodiment, each of the tread shape memory elements 44 also extend, wrap or coil around at least a portion of one or more of the inner shape memory elements 38 (and the inner contact portion 42 thereof). Therefore, the tread shape memory elements 44 secure the outer contact portion 30 to the inner contact portion 42. FIGS. 3 and 4 show each tread shape member element 44 coil or wrap around a single inner contact portion 42 and outer contact portion 30. FIG. 5 shows each tread shape member element 44 coil or wrap around two inner contact portions 42 and two outer contact portions 30. Any weaving pattern is within the scope of the present invention provided the tread shape member elements 44 connect or secure the inner contact portions 42 to the outer contact portions. In other words, the tread portion 16 couples or secures together the inner shape memory elements to the outer shape memory elements or the tread portion 16 couples or secures together the inner contact portion and the outer contact portion.

The tread shape memory elements 44 of the tread portion 16 are preferably interwoven with the inner shape memory elements 38 of the outer main body portion 14 (and specifically at least a portion of the outer contact portion 30 thereof) and the inner contact portion 42 of the bump stop assembly 18. The tread portion 16 springs being wrapped around or interwoven with the bump stop assembly 18 springs, wires or elements helps keep the tread portion 16 centered.

As shown in FIGS. 1-3, in a preferred embodiment, the wheel assembly 10 includes a plurality of lug sections 46. The lug sections 46 are shown with dashed lines in FIGS. 1-3 only to differentiate them from the non-lug sections. The lug sections 46 are formed by or comprise one or more (preferably a set of) outer shape memory elements 26 having a different stiffness than the surrounding or other outer shape memory elements 26 of the outer main body portion 14. For example, FIG. 1 shows five lug sections 46 around the circumference of the tire assembly 13 or outer main body portion 14. Each outer shape memory element 26 within the set of outer shape memory elements 26 in each lug section 46 has a different or higher stiffness than the outer shape memory elements 26 that are not within the lug sections 46. The outer shape memory elements 26 that are not within a lug section or set may be referred to herein as a regular or non-lug set or section. Therefore, the lug sections or sets and regular or non-lug sections or sets are preferably alternating. This essentially provides a first set of outer shape memory elements comprising harder springs and a second set of outer shape memory elements comprising softer springs. These lug sections 46 aid in climbing ability. For example, if the lug sections 46 have a greater stiffness than the remainder of the outer main body portion 14 (referred to herein as the non-lug sections—one of which is labeled as non-lug section 47 in FIG. 1), then the non-lug sections will deflect more than the lug sections 46 when a hard object (e.g., a rock) is contacted by the wheel assembly. Due to the higher stiffness of the lug section 46, the lug section 46 provides leverage against the object to help the wheel assembly climb over the object. In short, by alternating the deflection of different areas or sections of the outer main body portion 14 (different sets of outer shape memory elements), the lug sections 46 provide a different shape when sufficient pressure is applied by an object against the tire assembly. Lug sections can also be included in the bump stop assembly.

Figure 6:
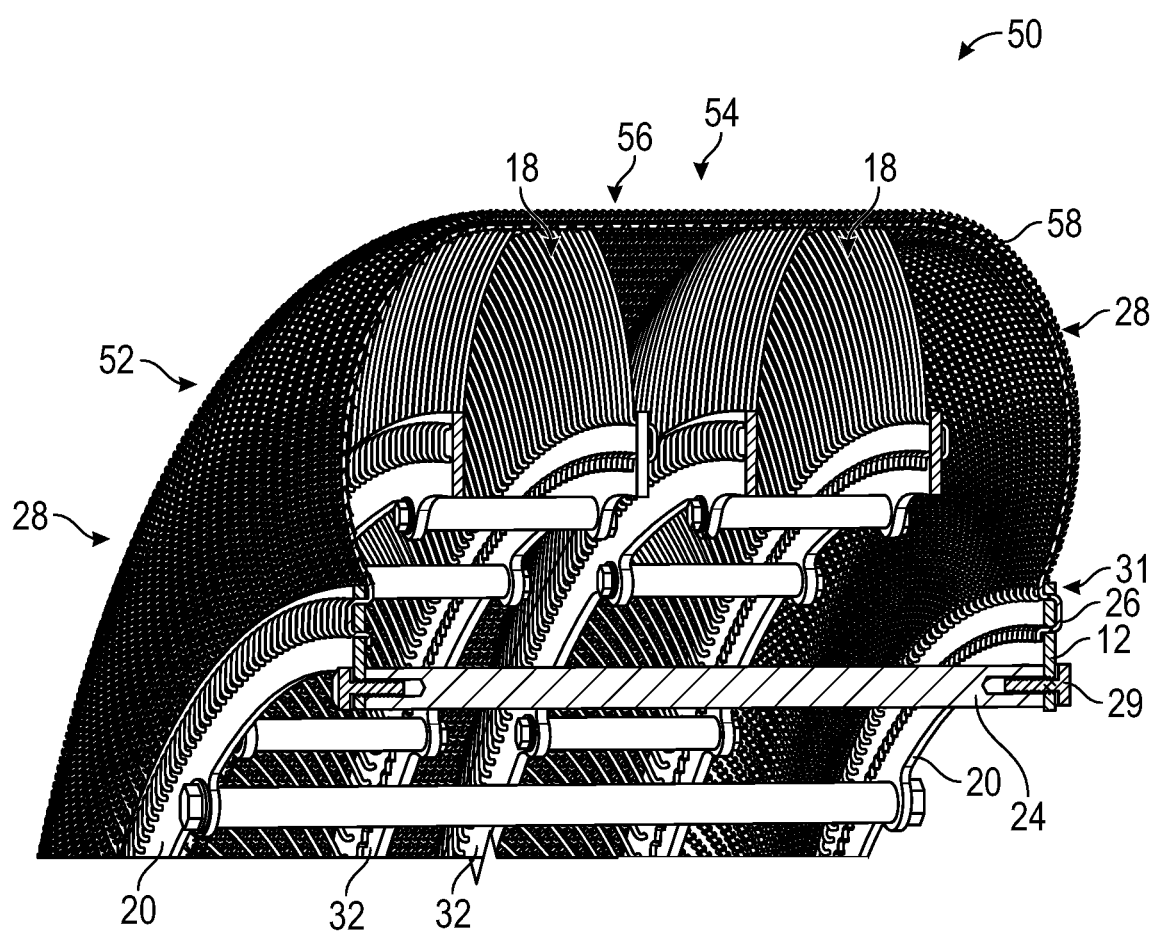
FIG. 6 is a perspective view of a wheel assembly with first and second bump stop assemblies in accordance with a preferred embodiment of the present invention.
Figure 7:
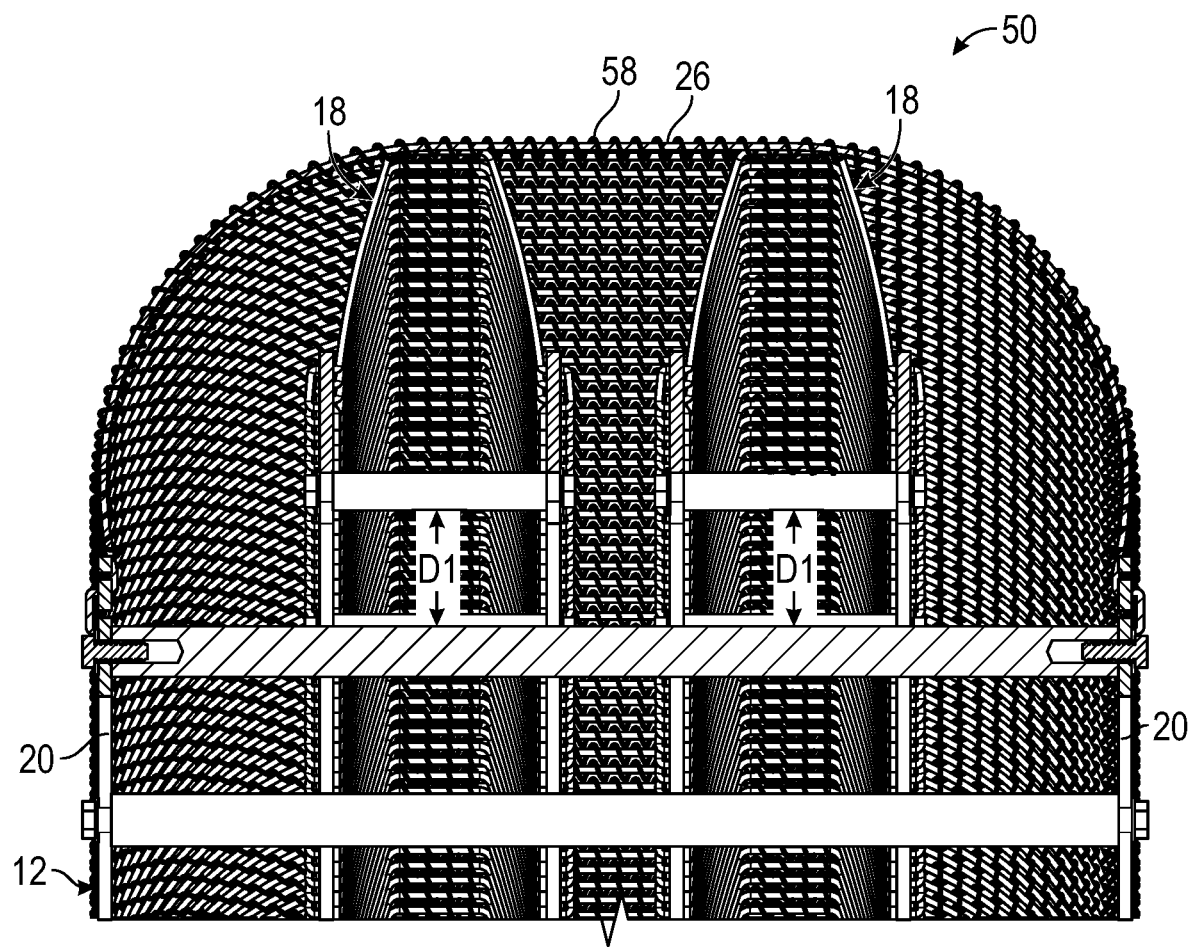
FIG. 7 is a cross-sectional elevational view of a portion of the wheel assembly of FIG. 6.
Figure 8:
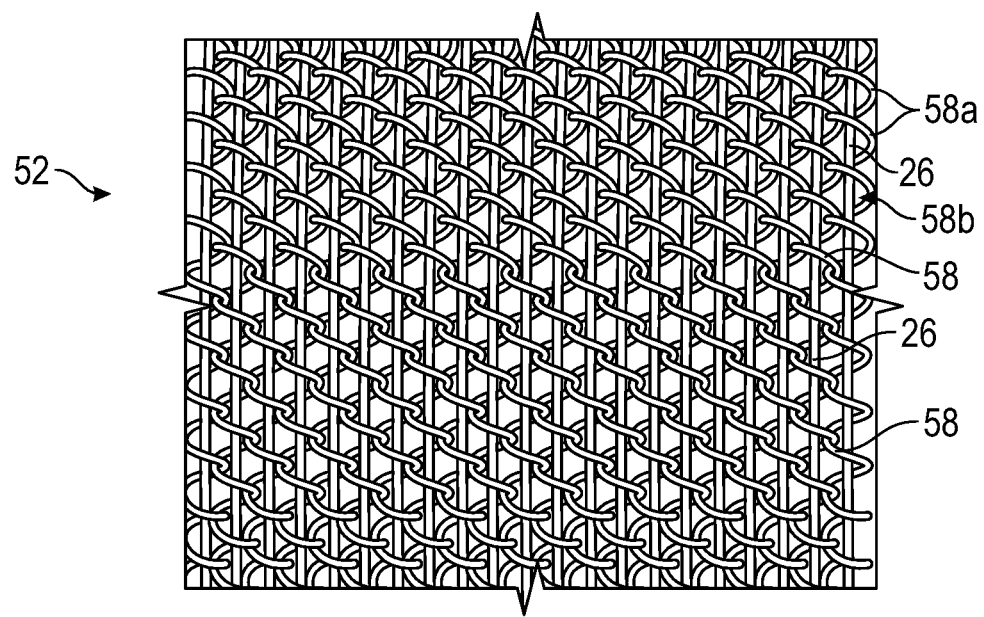
FIG. 8 shows a portion of a tire assembly with adjacent tread springs interwoven with one another.

FIGS. 6-8 show another preferred embodiment of the present invention embodied in a wheel assembly 50 that includes two or first and second bump stop assemblies 18, together with tire assembly 52, tread portion 54, outer contact portion 56 and tread shape memory elements 58. All description herein associated with wheel assembly 10 also applies to wheel assembly 50. The embodiments and the components of each are interchangeable. In another embodiment, more than two bump stop assemblies can be included.

The SMA wires or outer shape memory elements 26 extend radially outwardly from the first outer rim portion 20 to form the first outer side wall portion 28, then curve or extend transversely to form the outer contact portion 56 and then extend radially inwardly to form the second outer side wall portion 28 and to the second outer rim portion 20. To accommodate the first and second bump stop assemblies 18, the outer contact portion 56 of wheel assembly 50 has a wider and/or flatter configuration than the outer contact portion 56 of wheel assembly 10. In a preferred embodiment, each of the tread shape memory elements 58 of the tread portion 54 are preferably interwoven with the outer contact portion 56 and the inner contact portions 42 of the first and second bump stop assemblies 18.

Wheel assembly 50 with two bump top assemblies may provide a wider tire to reduce ground pressure for better floatation in soft soils, reduced filament diameter in bump stops, reducing stress in filament for durability and longevity particularly at cryogenic temperatures, redundancy for safety, good traction in soft soils, and higher load carrying capacities.

The tread portion 16 and the tread shape memory elements 44 thereof may extend only partially along the outer main body portion 14 (and the outer shape memory elements 26 thereof), as shown in FIGS. 1 and 2-5 or the tread portion 54 and the tread shape memory elements 58 thereof may extend all the way from the first outer rim portion 20 to the second outer rim portion 20, as shown in FIGS. 6 and 7.

For both wheel assembly 10 and wheel assembly 50, during use, the tire assembly 13 or 52 (the outer main body portion 14 and tread portion 16) may deflect when coming into contact with or rolling over an object. As a result, the bump stop assembly 18 will deflect or move radially inwardly toward the center of the wheel assembly. In a preferred embodiment, the bump stop assembly 18 includes a maximum deflection position where the first and second inner rim portions 32 contact or are stopped by one or more of the outer cross members 24. More specifically, the inner contact surface 32*a* of the first and second inner rim portions 32 contacts an outer surface 24*a* of one or more of the outer cross members 24 (see FIGS. 3 and 7). The outer surfaces 24*a* of the outer cross members 24 together combine to form a stop surface. The space or distance between the first and second inner rim portions 32 and the outer cross members 24 may be referred to herein as the deflection space or deflection distance and is labeled D1 in FIG. 7. In another embodiment, the plurality of outer cross members (or inner cross members) can be a circular wall, like the transverse or bottom wall on a typical rim. It should be understood that such a transverse wall reads on a plurality of cross members.

Adjacent tread shape memory elements or springs may be interwoven with one another as well as with the contact portions of the tire assembly and the bump stop assembly. For example, see FIG. 8, which shows each tread shape memory element 58 in a coiled spring shape having a plurality of coils 58*a* and defining a spring interior 58*b*. One outer shape memory element 26 and inner shape memory element 38 extend through the spring interior 58*b*, thereby coupling the outer shape memory element 26 to the first inner shape memory element 38. Also, individual coils 58*a* of one tread shape memory element can be interwoven, interlocked or connected to individual coils of adjacent tread shape memory elements, as shown in FIG. 8. This configuration provides circumferential stability and may help provide increased traction. Furthermore, it will be appreciated that the coil shape of the tread shape memory elements may help with traction.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A wheel assembly comprising:
    an outer rim assembly that defines a stop surface,
    a tire assembly that includes an outer main body portion, wherein the outer main body portion includes a plurality of outer shape memory elements having first and second opposite ends, wherein the first end of each outer shape memory element is connected to the outer rim assembly and the second end of each outer shape memory element is connected to the outer rim assembly, wherein the outer main body portion includes a first outer side wall portion, a second outer side wall portion, and an outer contact portion extending between the first and second outer side wall portions, and
    at least a first bump stop assembly that includes an inner rim assembly and an inner main body portion, wherein the inner main body portion includes a plurality of inner shape memory elements having first and second opposite ends, wherein the first end of each inner shape memory element is connected to the inner rim assembly and the second end of each inner shape memory element is connected to the inner rim assembly, wherein the inner main body portion includes a first inner side wall portion, a second inner side wall portion and an inner contact portion extending between the first and second inner side wall portions, and wherein the inner contact portion is coupled to the outer contact portion, wherein the inner rim assembly defines an inner contact surface, wherein a deflection distance is defined between the inner contact surface and the stop surface, and wherein when the outer main body portion is deflected a predetermined distance the inner contact surface contacts the stop surface.

2. The wheel assembly of claim 1 wherein the plurality of outer shape memory elements and plurality of inner shape memory elements are made of a shape memory alloy.

3. A wheel assembly comprising:
    an outer rim assembly,
    a tire assembly that includes an outer main body portion, wherein the outer main body portion includes a plurality of outer shape memory elements having first and second opposite ends, wherein the first end of each outer shape memory element is connected to the outer rim assembly and the second end of each outer shape memory element is connected to the outer rim assembly, wherein the outer main body portion includes a first outer side wall portion, a second outer side wall portion, and an outer contact portion extending between the first and second outer side wall portions, and
    at least a first bump stop assembly that includes an inner rim assembly and an inner main body portion, wherein the inner main body portion includes a plurality of inner shape memory elements having first and second opposite ends, wherein the first end of each inner shape memory element is connected to the inner rim assembly and the second end of each inner shape memory element is connected to the inner rim assembly, wherein the inner main body portion includes a first inner side wall portion, a second inner side wall portion and an inner contact portion extending between the first and second inner side wall portions, and wherein the inner contact portion is coupled to the outer contact portion, and
- a tread portion, wherein the tread portion includes a plurality of tread shape memory elements, wherein the tread portion couples the inner contact portion to the outer contact portion.

4. The wheel assembly of claim 3 wherein the plurality of tread shape memory elements comprises first and second tread shape memory elements, wherein the plurality of outer shape memory elements comprises first and second outer shape memory elements, wherein the plurality of inner shape memory elements comprises first and second inner shape memory elements, and wherein the first tread shape memory element couples the first outer shape memory element to the first inner shape memory element.

5. The wheel assembly of claim 3 wherein the first tread shape memory element wraps around the first outer shape memory element and the first inner shape memory element, thereby coupling the first outer shape memory element to the first inner shape memory element.

6. The wheel assembly of claim 3 wherein the first tread shape memory element includes a plurality of coils and defines a spring interior, and wherein the first outer shape memory element and the first inner shape memory element extend through the spring interior, thereby coupling the first outer shape memory element to the first inner shape memory element.

7. The wheel assembly of claim 6 wherein the second tread shape memory element includes a plurality of coils, wherein at least one of the plurality of coils of the first tread shape memory element is connected to at least one of the plurality of coils of the second tread shape memory element.

8. A wheel assembly comprising:
- an outer rim assembly,
- a tire assembly that includes an outer main body portion, wherein the outer main body portion includes a plurality of outer shape memory elements having first and second opposite ends, wherein the first end of each outer shape memory element is connected to the outer rim assembly and the second end of each outer shape memory element is connected to the outer rim assembly, wherein the outer main body portion includes a first outer side wall portion, a second outer side wall portion, and an outer contact portion extending between the first and second outer side wall portions, wherein the plurality of outer shape memory elements comprises a first set of lug shape memory elements and a second set of non-lug shape memory elements, wherein the lug shape memory elements have a greater stiffness than the non-lug shape memory elements, and
- at least a first bump stop assembly that includes an inner rim assembly and an inner main body portion, wherein the inner main body portion includes a plurality of inner shape memory elements having first and second opposite ends, wherein the first end of each inner shape memory element is connected to the inner rim assembly and the second end of each inner shape memory element is connected to the inner rim assembly, wherein the inner main body portion includes a first inner side wall portion, a second inner side wall portion and an inner contact portion extending between the first and second inner side wall portions, and wherein the inner contact portion is coupled to the outer contact portion.

9. A wheel assembly comprising:
- an outer rim assembly,
- a tire assembly that includes an outer main body portion, wherein the outer main body portion includes a plurality of outer shape memory elements having first and second opposite ends, wherein the first end of each outer shape memory element is connected to the outer rim assembly and the second end of each outer shape memory element is connected to the outer rim assembly, wherein the outer main body portion includes a first outer side wall portion, a second outer side wall portion, and an outer contact portion extending between the first and second outer side wall portions, and
- at least a first bump stop assembly that includes an inner rim assembly and an inner main body portion, wherein the inner main body portion includes a plurality of inner shape memory elements having first and second opposite ends, wherein the first end of each inner shape memory element is connected to the inner rim assembly and the second end of each inner shape memory element is connected to the inner rim assembly, wherein the inner main body portion includes a first inner side wall portion, a second inner side wall portion and an inner contact portion extending between the first and second inner side wall portions, and wherein the inner contact portion is coupled to the outer contact portion, and
- a second bump stop assembly that includes a second inner contact portion, and wherein the second inner contact portion is coupled to the outer contact portion.

10. A wheel assembly comprising:
- an outer rim assembly that defines a stop surface,
- a tire assembly connected to the outer rim assembly, wherein the tire assembly includes an outer main body portion, wherein the outer main body portion includes a first outer side wall portion, a second outer side wall portion, and an outer contact portion extending between the first and second outer side wall portions, and
- at least a first bump stop assembly that includes an inner rim assembly and an inner main body portion, wherein the inner main body portion includes a first inner side wall portion, a second inner side wall portion and an inner contact portion extending between the first and second inner side wall portions, wherein the inner contact portion is coupled to the outer contact portion, wherein the inner rim assembly defines an inner contact surface, wherein a deflection distance is defined between the inner contact surface and the stop surface, and wherein when the outer main body portion is deflected a predetermined distance the inner contact surface contacts the stop surface.

11. The wheel assembly of claim 10 wherein the outer main body portion includes at least a first outer shape memory element having first and second opposite ends, wherein the first end of the first outer shape memory element is connected to the outer rim assembly and the second end of the first outer shape memory element is connected to the outer rim assembly, wherein the inner main body portion includes at least a first inner shape memory element having first and second opposite ends, wherein the first end of the first inner shape memory element is connected to the inner rim assembly and the second end of the first inner shape memory element is connected to the inner rim assembly, and wherein the first inner shape memory element is coupled to the first outer shape memory element.

12. The wheel assembly of claim 11 further comprising at least a first tread shape memory element, wherein the first tread shape memory element couples the first inner shape memory element to the first outer shape memory element.

13. A wheel assembly comprising:
an outer rim assembly,
a tire assembly connected to the outer rim assembly, wherein the tire assembly includes an outer main body portion, wherein the outer main body portion includes a first outer side wall portion, a second outer side wall portion, and an outer contact portion extending between the first and second outer side wall portions, wherein the tire assembly defines a tire assembly outer diameter, and
at least a first bump stop assembly that includes an inner rim assembly and an inner main body portion, wherein the inner main body portion includes a first inner side wall portion, a second inner side wall portion and an inner contact portion extending between the first and second inner side wall portions, and wherein the inner contact portion is coupled to the outer contact portion about the tire assembly outer diameter.

14. A wheel assembly comprising:
an outer rim assembly,
a tire assembly connected to the outer rim assembly, wherein the tire assembly includes an outer main body portion, wherein the outer main body portion includes a first outer side wall portion, a second outer side wall portion, and an outer contact portion extending between the first and second outer side wall portions, wherein the tire assembly defines a tire assembly outer circumference, and
at least a first bump stop assembly that includes an inner rim assembly and an inner main body portion, wherein the inner main body portion includes a first inner side wall portion, a second inner side wall portion and an inner contact portion extending between the first and second inner side wall portions, and wherein the inner contact portion is coupled to the outer contact portion about the tire assembly outer circumference.

15. A wheel assembly comprising:
an outer rim assembly,
a tire assembly that includes an outer main body portion, wherein the outer main body portion includes a plurality of outer shape memory elements having first and second opposite ends, wherein the first end of each outer shape memory element is connected to the outer rim assembly and the second end of each outer shape memory element is connected to the outer rim assembly, wherein the outer main body portion includes a first outer side wall portion, a second outer side wall portion, and an outer contact portion extending transversely between the first and second outer side wall portions, wherein the plurality of outer shape memory elements comprises a first set of lug shape memory elements and a second set of non-lug shape memory elements, wherein the lug shape memory elements have a greater stiffness than the non-lug shape memory elements.

16. The wheel assembly of claim 15 further comprising at least a first bump stop assembly that includes an inner rim assembly and an inner main body portion, wherein the inner main body portion includes a first inner side wall portion, a second inner side wall portion and an inner contact portion extending transversely between the first and second inner side wall portions, and wherein the inner contact portion is coupled to the outer contact portion.

17. A wheel assembly comprising:
an outer rim assembly,
a tire assembly connected to the outer rim assembly, wherein the tire assembly includes an outer main body portion, wherein the outer main body portion includes a first outer side wall portion, a second outer side wall portion, and an outer contact portion extending between the first and second outer side wall portions,
a first bump stop assembly that includes an inner rim assembly and an inner main body portion, wherein the inner main body portion includes a first inner side wall portion, a second inner side wall portion and an inner contact portion extending between the first and second inner side wall portions, and wherein the inner contact portion is coupled to the outer contact portion, and
a second bump stop assembly that includes a second inner contact portion, and wherein the second inner contact portion is coupled to the outer contact portion.

* * * * *